United States Patent Office 2,941,684
Patented June 21, 1960

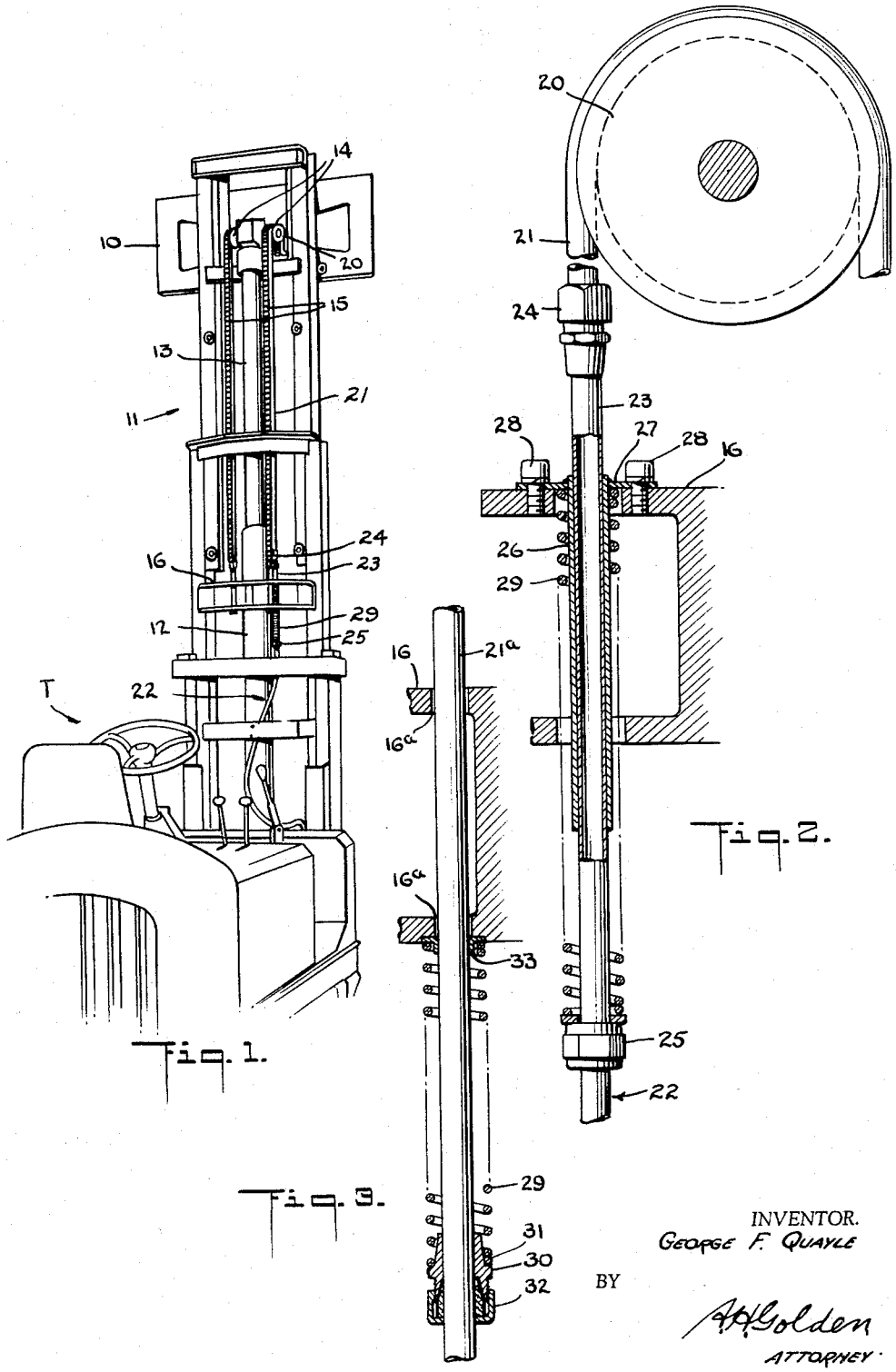

2,941,684

HOSE GUIDE FOR LIFT TRUCK

George F. Quayle, Philadelphia, Pa., assignor to The Yale & Towne Manufacturing Company, Stamford, Conn., a corporation of Connecticut Filed July 1, 1957, Ser. No. 668,999

8 Claims. (Cl. 214—652)

This invention relates to guide means for hydraulic hoses on lift trucks.

Those persons skilled in the art will appreciate that lift trucks frequently are equipped with a flexible hydraulic hose extending to the load carriage on the truck, so that power can be directed to a load manipulator that may be utilized upon the carriage. It has already been recognized that the trucks, when equipped with such a hose, should have means that guide the hose during the movements of the load carriage so as to protect the hose against wear and damage. Thus, it is rather usual to utilize one or more reels over which the hose is reeved whereby to maintain the hose free from slack, and to hold the hose in a position that will protect the hose against damage that may take place incidental to the operation of the truck.

Many of the prior hose guiding constructions operate rather well. Nevertheless, it has been found that the hydraulic hose tends to leave a reel over which it is reeved, when fluid pressure is applied to the hose. This is due to the fact that the fluid pressure, when acting against the inside surface of the hose, causes the hose to yield somewhat, with the hose tending to straighten and to move out of guide relation to the reel. I have conceived by my invention an exceedingly novel construction that will enable a reel to be utilized for guiding a hose of the particular class, but with the hose maintained very effectively in guide position on the reel when pressure is applied to the hose. Thus, as an important feature of my invention, I utilize yielding means that will press a part of the hose longitudinally, the arrangement being such that the yielding means will hold under tension the part of the hose that extends around the reel. The yielding means will act in that way even though the reel may be arranged to take up slack through its movement with a part of the truck.

As a more particular feature, I equip the hose with a portion that forms a spring seat, and I utilize a spring that acts between the spring seat and a relatively stationary part whereby to apply tension to the hose. The spring, by so acting, will hold the hose in guide relation to the reel. Moreover, the spring will do this in those trucks in which the reel moves to guide the hose as the load carriage moves relatively to the truck.

In the construction that I prefer, I equip the truck with guide surfaces through which I guide a part of the hose for movement in the direction of its axis. I prefer to attach to the hose a length of metal pipe, which will be the part that actually guides the hose through sliding on the guide means. The spring in that arrangement will be a coil spring that encircles the pipe and that acts between the guide means and the spring seat on the pipe.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 shows a lift truck that utilizes my novel hose guide.

Fig. 2 is a section showing the hose guide in more detail.

Fig. 3 shows a further construction that I may utilize in my novel hose guide.

For the purpose of describing my invention, I show in Fig. 1 an industrial truck T that is equipped with a load lifting carriage 10 that moves vertically on uprights 11 relatively to the truck. The truck T is equipped also with a hydraulic ram cylinder 12 in which a ram piston 13 slides to lift the carriage 10. The piston 13 does this through rollers 14 that act in a usual way against load chains 15 that are attached to carriage 10 and to a cross member 16 on the uprights 11, as will be understood. I believe it will be unnecessary to describe further details of the truck T and the means that lift the carriage 10, since those details are not important to an understanding of the invention that forms the subject of this application.

Referring again to Fig. 1, it will be seen that the ram piston 13 carries a reel 20 for guiding a flexible hydraulic hose 21, that hose extending to the load carriage 10 to supply fluid pressure for operating a load manipulator that may be mounted on the carriage. Actually, in the construction that I have chosen to illustrate in Figs. 1 and 2, the hose 21 extends substantially from the cross member 16 on the truck and is simply one part of a hydraulic line 22 extending from a suitable source of fluid pressure on the truck T to the carriage 10, but it is important here to know merely that opposed ends of hose 21 are attached relatively to the carriage and a relatively stationary part of the truck, with a part of hose 21 reeved over the reel 20.

Those persons skilled in the art will recognize that the arrangement I have thus far described, while rather conventional, does have certain advantages since the reel 20, by moving with the ram piston 13, will act automatically to take up slack in the hose 21 as the ram moves to lift the load carriage 10. However, as I have already indicated, the hose will tend to move out of guide relation to a reel over which it is reeved, due to the effect of the fluid pressure that causes the hose to yield and to straighten. I shall now describe the novel means that enable me to maintain the hose 21 in guide relation to the reel 20.

In the form of my invention that I prefer, and that is well shown in Figs. 1 and 2, I attach one end of the flexible hose 21 to a metal pipe 23 through a coupling 24 at a point slightly above the cross member 16 on the truck uprights 11. The pipe 23 then extends downwardly past cross member 16, and I attach the lower end of pipe 23 through a coupling 25 to a further part of hydraulic line 22, whereby the pipe is a part of that line. I assemble on the pipe 23 a guide sleeve 26 in which the pipe can slide relatively to the cross member 16. I prefer to arrange the sleeve 26 in relatively large openings in the cross member 16, well shown in Fig. 2, with a flange 27 on the sleeve secured to the cross member through bolts 28.

Further, I assemble on the guide sleeve 26 a coil spring 29 that acts between the guide sleeve flange 27 and the lower coupling 25 on pipe 23. The arrangement is such that the spring 29 will slide the metal pipe 23 downwardly to press one end of the flexible hose 21 in the direction of its axis. Thereby, while guiding the hose 21 on the relatively stationary cross member 16, I maintain a considerable amount of tension in that part of the hose 21 that is reeved around the reel 20. This enables me to hold the hose 21 firmly in guide relation to the reel 20 when the hose tends to move due to hydraulic pressure acting in the hose. Further, my novel concept enables me to maintain that guide relation between the hose 21 and reel 20 when the ram piston 13 moves the reel 20. With the hose thus maintained in guide relation to the reel, the reel 20 can act positively to guide the hose 21 during the movements of the load carriage on the truck.

Of course, I do not wish to be limited to a metal pipe as a part of the hydraulic line, since it is conceivable that I may utilize my novel inventive concept in an arrangement that does not have a metal pipe. Thus, for example, I show in Fig. 3 a construction that utilizes simply a continuous flexible hose 21a, that hose being guided longitudinally merely through its position in openings 16a in the cross member 16 on the uprights. In that construction, I may utilize on the flexible hose 21a a part 30 that forms a spring seat 31 encircling the hose, and that is clamped in position on the hose through a nut 32. I can then arrange the coil spring 29 to act merely between the spring seat 31 and the cross member 16, or a seat member 33 on the cross member. Whether I utilize the particular construction that I show in Fig. 3, or that shown in Fig. 2, the hose 21 will be guided for longitudinal movement, with yielding means acting relatively to the hose to maintain the hose in guide relation to the reel 20. Through my novel concept, I am able to guide the hose very positively so that there will be practically no possibility that the hose will be subjected to damage or undue wear, due to the movements of the load carriage or the truck. I believe, therefore, that those skilled in the art will appreciate fully the very considerable contribution that I have made by my invention.

I now claim:

1. In a truck of the class described having a load moving member mounted for movement relatively to the truck, a hydraulic line extending between the truck and load moving member and including a hose, a reel around which a part of said hose is reeved for guiding the hose, means mounting said reel for movement whereby to take up slack in said hose during the movements of the load moving member, said hose tending to move out of guide relation to said reel when the hose yields due to the application of fluid pressure thereto, guide means mounting a part of said hose relatively to the truck for movement in a direction longitudinal of said hose part, a spring seat on the hose, a spring acting against said spring seat to press longitudinally the part of the hose that is mounted through said guide means whereby to apply tension to the part of the hose that extends around the reel, and said spring by so acting effective to hold the hose relatively to the reel when fluid pressure is applied to the hose.

2. In a truck of the class described having a load moving member mounted for movement relatively to the truck, a hydraulic line extending between the truck and load moving member and including a hose, a reel around which a part of said hose is reeved for guiding the hose, said hose tending to move out of guide relation to said reel when the hose yields due to the application of fluid pressure thereto, guide means mounting a part of said hose for longitudinal movement, a spring seat on the hose, a coil spring encircling the hydraulic line and engaged between a part on the truck and said spring seat to press longitudinally the part of the hose that is mounted through said guide means whereby to apply tension to the part of the hose that extends around the reel, and said spring by so acting effective to hold the hose relatively to the reel when fluid pressure is applied to the hose.

3. In a truck of the class described having a load moving member mounted for movement relatively to the truck, a hydraulic line extending between the truck and the load moving member and including a hose, a reel around which a part of said hose is reeved for guiding the hose, said hose tending to move out of guide relation to said reel when the hose yields due to the application of fluid pressure thereto, a length of pipe positioned between portions of said hose and through which the fluid flows whereby said pipe forms an effective part of said hose, guide means for said pipe mounting said pipe for sliding relatively to a part on the truck, yielding means pressing said pipe relatively to its guide means whereby to press the hose longitudinally, and said yielding means by so pressing the hose applying tension to the part of the hose that extends around the reel to hold the hose relatively to the reel when fluid pressure is applied to the hose.

4. In a truck of the class described having a load moving member mounted for movement relatively to the truck, a hydraulic line extending between the truck and the load moving member and including a hose, a reel around which a part of said hose is reeved for guiding the hose, said hose tending to move out of guide relation to said reel when the hose yields due to the application of fluid pressure thereto, a length of pipe positioned between portions of said hose and through which the fluid flows whereby said pipe forms an effective part of said hose, guide means for said pipe mounting said pipe for sliding relatively to a part on the truck, a spring seat on said pipe, a coil spring acting between said spring seat and said guide means to press the hose longitudinally whereby to apply tension to the part of the hose that extends around the reel, and said spring by so acting effective to hold the hose relatively to the reel when fluid pressure is applied to the hose.

5. In a truck of the class described having a load moving member mounted for movement relatively to the truck, a hose extending between the truck and load moving member, a reel around which a part of said hose is reeved for guiding the hose, means mounting said reel for movement whereby to take up slack in said hose during the movements of the load moving member, said hose tending to move out of guide relation to said reel when the hose yields due to the application of fluid pressure thereto, a coil spring engaged with a part on the truck and encircling the hose, a spring seat through which said coil spring acts against the hose to apply longitudinal tension to the part of the hose that extends around the reel, and said spring by so acting effective to hold the hose relatively to the reel when fluid pressure is applied to the hose.

6. In a take-up for a hose of the class described, said hose extending between a relatively stationary and a relatively moving member, a reel around which a part of said hose is reeved whereby to guide the hose, means mounting said reel for movement whereby to take up slack in the hose during the movements of the relatively moving member, said hose tending to move out of guide relation to the reel when the hose yields due to fluid pressure that is applied against the inside surface of the hose, yielding means pressing a further part of said hose longitudinally to maintain tension in that part of the hose that extends around the reel, and said yielding means by so pressing the hose acting to hold the hose against the reel when the hose tends to move due to fluid pressure therein.

7. In a take-up for a hose of the class described, said hose extending between a relatively stationary and a relatively moving member, a reel mounted for movement on said relatively stationary member and around which a part of said hose is reeved, means moving said reel on its mounting to guide the hose during the movements of the relatively moving member, said hose tending to move out of guide relation to the reel when the hose yields due to fluid pressure that is applied against the inside surface of the hose, guide means guiding a further part of said hose for longitudinal movement relatively to said stationary member, a spring seat on said hose, a spring acting between said stationary member and spring seat whereby to maintain tension in that part of the hose that extends around the reel, and said spring by so acting effective to hold the hose against the reel when the hose tends to move due to fluid pressure therein.

8. In a truck of the class described having a load manipulating member, a source of hydraulic pressure, a hydraulic line extending from said source of pressure to said manipulating member and including a flexible hose, a reel around which said hose is reeved for guiding the hose, said hose tending to move out of guided relation to said reel when the hose yields incidental to the application of high fluid pressure therethrough to said manipulating member, a bearing device secured relatively to said hose, and yielding means positioned to act against said bearing device in a direction to apply tension to said hose longitudinally thereof and tangentially to said reel whereby to hold the hose in guided relation to the reel when high fluid pressure is applied to the hose.

References Cited in the file of this patent

UNITED STATES PATENTS

| | | |
|---|---|---|
| 1,315,684 | Primrose et al. | Sept. 9, 1919 |
| 2,369,089 | Thomas | Feb. 6, 1945 |
| 2,513,928 | Frischmann | July 4, 1950 |
| 2,574,045 | Lapham | Nov. 6, 1951 |
| 2,739,445 | Hoban | Feb. 28, 1956 |
| 2,794,538 | Schenk | June 4, 1957 |

FOREIGN PATENTS

| | | |
|---|---|---|
| 1,009,021 | France | Feb. 27, 1952 |